United States Patent
Chen et al.

(10) Patent No.: US 9,026,878 B2
(45) Date of Patent: May 5, 2015

(54) APPARATUS AND METHOD FOR FAST RETRANSMISSION IN A POWER LINE COMMUNICATION NETWORK

(75) Inventors: Jian Feng Chen, Beijing (CN); Zhi Gang Zhang, Beijing (CN); Yan Feng Zhang, Beijing (CN); Li Zou, Shanghai (CN)

(73) Assignee: Thomson Licensing, Billancourt (FR)

( * ) Notice: Subject to any disclaimer, the term of this patent is extended or adjusted under 35 U.S.C. 154(b) by 339 days.

(21) Appl. No.: 12/734,591

(22) PCT Filed: Nov. 11, 2008

(86) PCT No.: PCT/IB2008/003034
§ 371 (c)(1),
(2), (4) Date: May 11, 2010

(87) PCT Pub. No.: WO2009/063286
PCT Pub. Date: May 22, 2009

(65) Prior Publication Data
US 2010/0257420 A1    Oct. 7, 2010

(30) Foreign Application Priority Data
Nov. 13, 2007   (EP) .................... 07301544

(51) Int. Cl.
*G06F 11/00* (2006.01)
*H04L 1/18* (2006.01)
*H04L 1/00* (2006.01)

(52) U.S. Cl.
CPC ....... *H04L 1/1867* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 6,031,818 A | | 2/2000 | Lo et al. |
| 7,174,493 B2 * | | 2/2007 | Matsumoto et al. ......... 714/748 |
| 2003/0006883 A1 * | | 1/2003 | Kim et al. ............... 340/310.01 |
| 2007/0115973 A1 * | | 5/2007 | Koga et al. .................... 370/389 |
| 2008/0031177 A1 * | | 2/2008 | Lee et al. ...................... 370/312 |
| 2008/0222478 A1 * | | 9/2008 | Tamaki ........................ 714/749 |
| 2009/0154356 A1 * | | 6/2009 | Wiemann et al. ............ 370/236 |
| 2009/0252200 A1 * | | 10/2009 | Dohler et al. ................. 375/141 |
| 2010/0254402 A1 * | | 10/2010 | Kliger et al. ................. 370/442 |

FOREIGN PATENT DOCUMENTS

| | | |
|---|---|---|
| EP | 1770921 | 4/2007 |
| WO | WO9907112 | 2/1999 |
| WO | WO2005008947 | 1/2005 |

OTHER PUBLICATIONS

Chen:"A Fast Retransmission Mechanism in Power Line Communication Network," Corporate Research, Beijing, Thomson, 2008.
Search Report Dated Jun. 19, 2009.

* cited by examiner

*Primary Examiner* — Christopher McCarthy
(74) *Attorney, Agent, or Firm* — Robert D. Shed; Brian J. Cromarty

(57) ABSTRACT

A fast retransmission method by introducing the internal node under better channel condition to join the work of retransmission after the destination node sends out the packet loss indication for unicast services. Extended to serve multicast services, a system comprising a plurality of nodes utilizes the farthest node in each branch from the source to transmit an acknowledge signal when packet loss occurs. The system then enables the closest node to the acknowledging node to retransmit the requested packet, thereby improving the target packet hit rate and data integrity with less retransmission steps.

9 Claims, 4 Drawing Sheets

APPARATUS AND METHOD FOR FAST RETRANSMISSION IN A POWER LINE COMMUNICATION NETWORK

This application claims the benefit, under 35 U.S.C. §365 of International Application PCT/IB2008/003034, filed Nov. 11, 2008, which was published in accordance with PCT Article 21(2)on May 22, 2009 in English and which claims the benefit of European patent application No. 07301544.8, filed Nov. 13, 2001.

BACKGROUND OF THE INVENTION

This invention relates to a method for creating a network from technical devices, such as digital electronic consumer devices and/or computers. More particularly this invention relates to technology to transmit high quality video and audio over power-line networks and a fast retransmission method to improve target packet hit rate (TPHR), where $$TPHR = \frac{\text{Number of receiving packet at destination node}}{\text{Number of original packet at source node}}$$

for both unicast and multicast services.

Power line communication networks have proven to be a cost-effective solution for the construction of in-building network to deliver broadband audio, video, and data services. One advantage is the low installation cost saving resulting from the usage of the existing low-voltage cable and AC outlets. The development of power line communication standards such as HomePlug AV and Open PLC European Research Alliance (OPERA) have boosted the achievable data rate up to 200 Mbps or more in the physical layer. One drawback is that the indoor power-line channel is a frequency selective fading channel with time-varying characteristics susceptible to performance degrading interference. One such source of interference is the colored and impulsive noise generated by electrical appliances and external sources. Another source of interference is the multi-path response corresponding with the power cable layout and loading conditions. Such a harsh transmission environment could cause highly unpredictable interference and damage a series of consecutive packets. Packet loss rate has been found to be small if the running traffic is light loaded, and increases significantly once the sending rate exceeds a threshold value. Such a threshold may have great variation under different connection topology or in the environment with other power appliances interference existing.

In retransmission mechanisms which take place directly between the source and destination node, such as ARQ (Auto Repeat reQuest), the receiver sends out acknowledge signal (NACK) when packet loss is found. In response, the source node is configured to transmit the requested data block. Most existing multicast protocols adopt a static retransmission scheme (unicast or multicast) to retransmit lost packets. Static unicast mode may result in great network load increase, while the multicast mode may cause accuracy variation among receivers.

In recent years, some QoS enhancement technologies for reliable video transmission through PLC network have been proposed. Most focus on the forward error control (FEC) in application layer, and the deployment of multiple description coding (MDC). The transmission efficiency of these two approaches however are affected greatly when the sending rate is higher than the threshold value, especially under the condition when packet loss rate is increasing, as these two approaches both require adding redundant information with the service stream to improve the robustness when part of the information is lost. The introducing of redundant data will add the burden of traffic load, which will lead to more severe packet loss. Therefore, the supplement of the redundant data is only suitable in the scenario when the average packet loss rate is low and enough free bandwidth is available. As far as the data integrity is considered, the retransmission mechanism is necessary and it should be deployed in any system suffered with burst or constant packet loss. When the source sending rate exceeds the threshold value, the packet loss rate increases with the augment of sending rate, and the packet loss rate has great variation among different peers. Thus, it is desirable to have a method of addressing packet loss rate while avoiding the previously stated problems.

SUMMARY OF THE INVENTION

In accordance with an aspect of the present invention, an apparatus and method for broadcasting data in a network of nodes is disclosed. The data may comprise video signals, audio signals, both audio and video signals, and forms of data, such as text, auxiliary data, or encoded information. According to an exemplary embodiment, the invention provides a method of communicating a packet comprising the steps of receiving the packet from a source, receiving a retransmission request for the packet from a node; and transmitting the packet to said node in response to said retransmission request.

In another exemplary embodiment of the present invention, the invention provides an apparatus comprising an interface for receiving a packet from a source, for receiving a retransmission request from a node, and for transmitting the packet to the node in response to the retransmission request and a memory for storing said packet.

In a further exemplary embodiment of the present invention, the invention provides a method of communicating a data packet via a network comprising the steps of transmitting a data packet when receiving a retransmission request for said data packet incrementing a sequence number in response to said retransmission request, and retransmitting said data packet in response to said sequence number reaching a first predetermined value.

DETAILED DESCRIPTION

Figure 1:
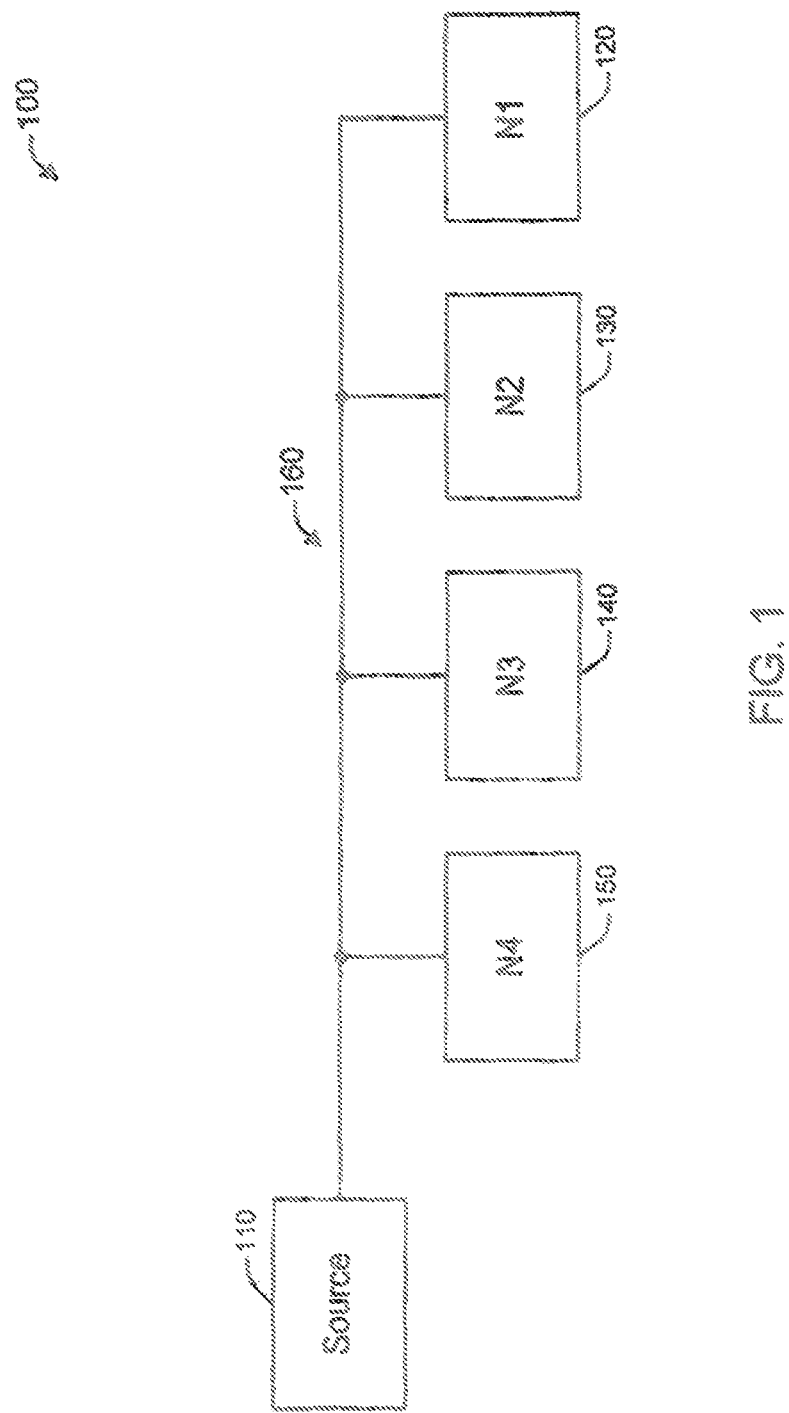
FIG. 1 illustrates an exemplary embodiment of a fast retransmission configuration in a unicast powerline network according to the present invention.

Other than the inventive concept, the elements shown in the figures are well known and will not be described in detail. The present invention addresses the problem of lost packets retransmission in the PLC network for both unicast and multicast services. Turning to FIG. 1, an exemplary embodiment of a fast retransmission configuration in a unicast powerline network (100) is shown. The network comprises a source (110) and four nodes (120-150) connected by a network transmission medium (160). In the present exemplary embodiment, the network transmission medium is a power line, similar to those found in residences, although, one skilled in the art would recognize that the principles of the present invention apply equally to other shared network transmission mediums, such as network cable, coaxial cable, wireless or optical network mediums.

In order to improve the retransmission efficiency an internal node (120) is introduced to join the retransmission work, some internal nodes (130-150) near to the destination node (120) will give response when the NACK is captured. Comparing with the channel condition between the source (110) and destination node (120), the internal node (130, 140, 150) is likely to have better channel quality in the factor of shorter transmission distance and lower interference, consequently, the target packet hit rate will increase and the step of retransmission will reduce.

The process for implementing the retransmission mechanism according to the present invention is composed of two steps. First, the source (110) determines the transmission sequence based on the topology and the service session allocation. For unicast service, assuming two or more internal nodes (130, 140, 150) aligned in the transmission path, the first node (130) and the second node (140) will be assigned directly. If there had been only one internal node existing (not shown) only 1$^{st}$ node will be labeled. The second step comprises the algorithm for retransmission processing as show in FIG. 2.

Figure 2:
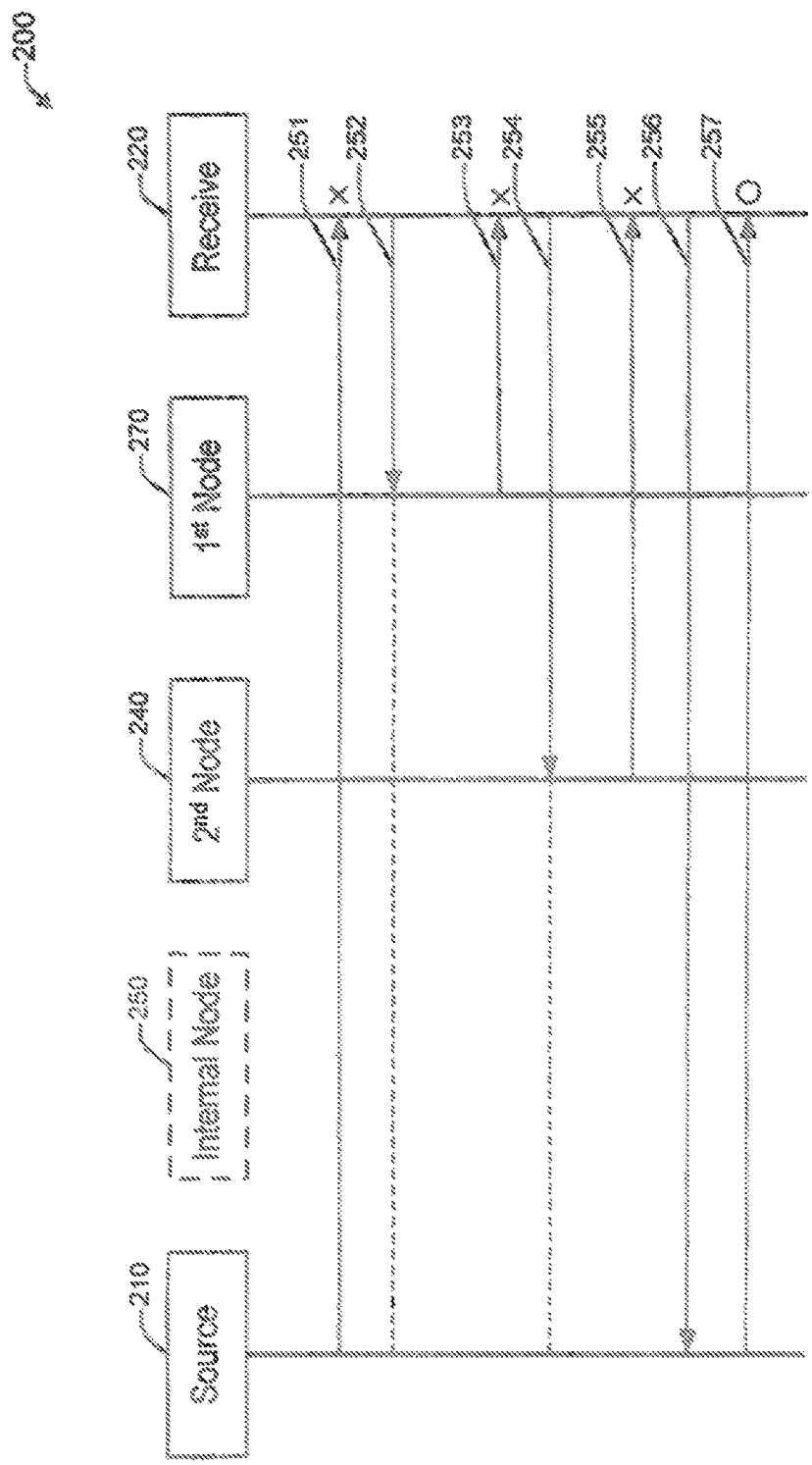
FIG. 2 illustrates a process flow of a fast retransmission configuration to the present invention.

Turning to FIG. 2 the algorithm for retransmission processing (200) is shown. In this exemplary embodiment, the request for the retransmission of one loss packet can be done at most three times. However, the number of requests is determined in response to design and operational requirements and can be set accordingly to any value. When the receiver sends out NACK signal, there is an index to tell the time sequence for the request, and then different internal node or source node will send out the buffered data if necessary. The source terminal (210) transmits (251) data block #1 to the receive terminal (220). If the data block is corrupted for any reason, the receive terminal (220) sends out the first NACK (252) for data block #1. In response, the first node (230) will be assigned and will retransmit the data block #1 to the receive block (253). If again the retransmission fails, the receive block (220) will send out a second NACK (254). In response, the second node (240) will be assigned and will retransmit the data block #1 in response to the second NACK (254) for data block #1. If again the retransmission fails, the receive block (220) will send out a third NACK (256). In this exemplary embodiment with a limit of 3 NACKs, the source node (240) is in charge of the response for the NACK to retransmit the data block #1 (257). Because in each time of retransmission, only one node (either internal or source) could send out the requested data block, there will be reduced interference during the time of retransmission.

When implementing the MAC protocol of power line communication, both Time Division Multiple Access (TDMA) and Frequency Division Multiple Access (FDMA) allocation modes may be supported. The retransmission can be scheduled in the contention free time slot in the TDMA or non-conflict frequency in the FDMA, so that there will be no interference with other type of data transmission.

Figure 3:
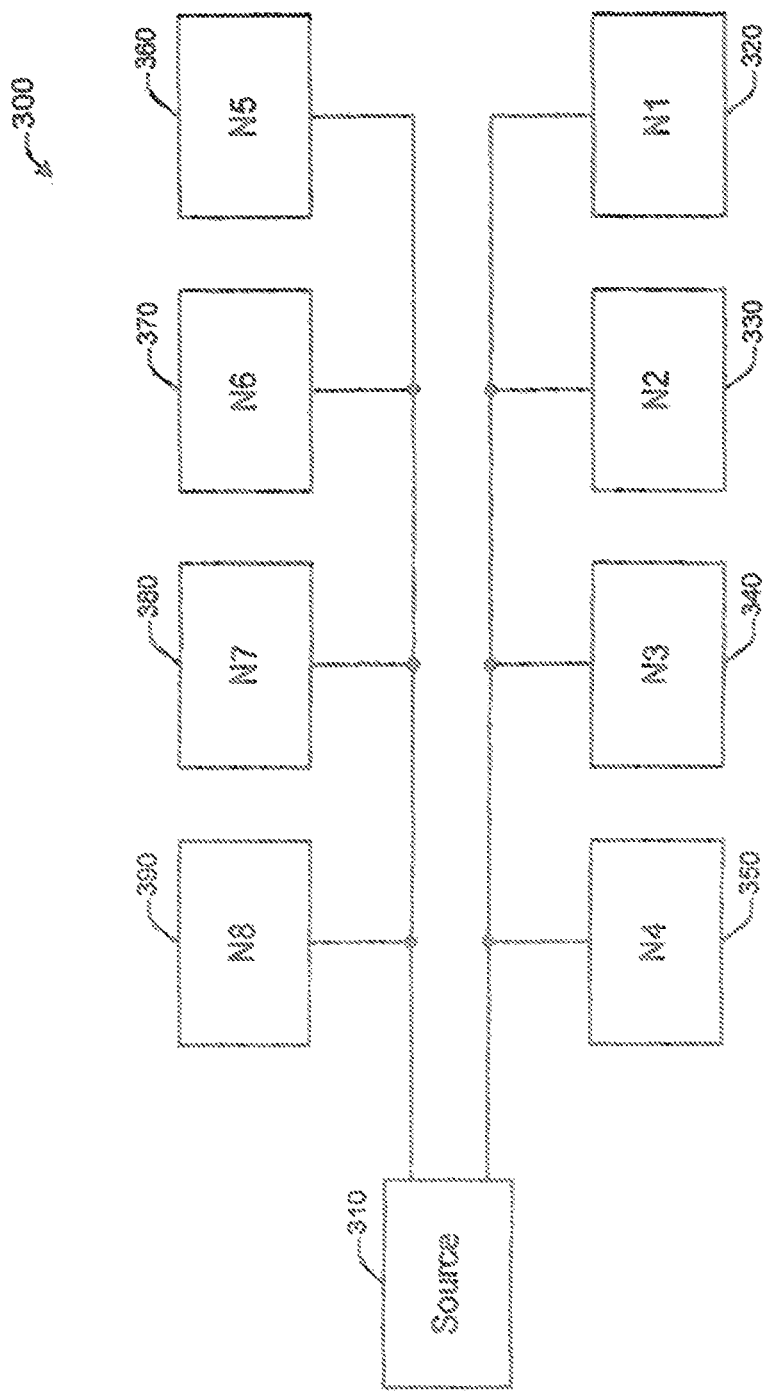
FIG. 3 illustrates an exemplary embodiment of a fast retransmission configuration in a multicast powerline network according to the present invention.

Turning now to FIG. 3, an exemplary embodiment of a fast retransmission configuration in a multicast powerline network (100) is shown. The proposed method according to the present invention is extended into multicast transmission by selecting one indication node in each branch (320-350, 360-390), then fulfilling retransmission from one selected internal node (340), thus a balance of robust transmission and light network load can be achieved. For multicast service, if all the receivers are located in the same branch (320-350), the node (320) with the longest distance from the source (310) will be selected as the node (320) to send NACK indication during transmission, the assignment of internal nodes follows the same policy for unicast service. If the receiver nodes are located in different branches (320-350, 360-390), the selection of longest distance node (320, 360) and the assignment will be done in each branch (320-350, 360-390). For multicast service, only the assigned indication node can send out the NACK signal, the retransmission will be processed in each branch with the same policy mentioned above. One retransmission time slot will be allocated in the frame beacon for each branch if the receiver nodes are located in different branches to prevent interference.

Figure 4:
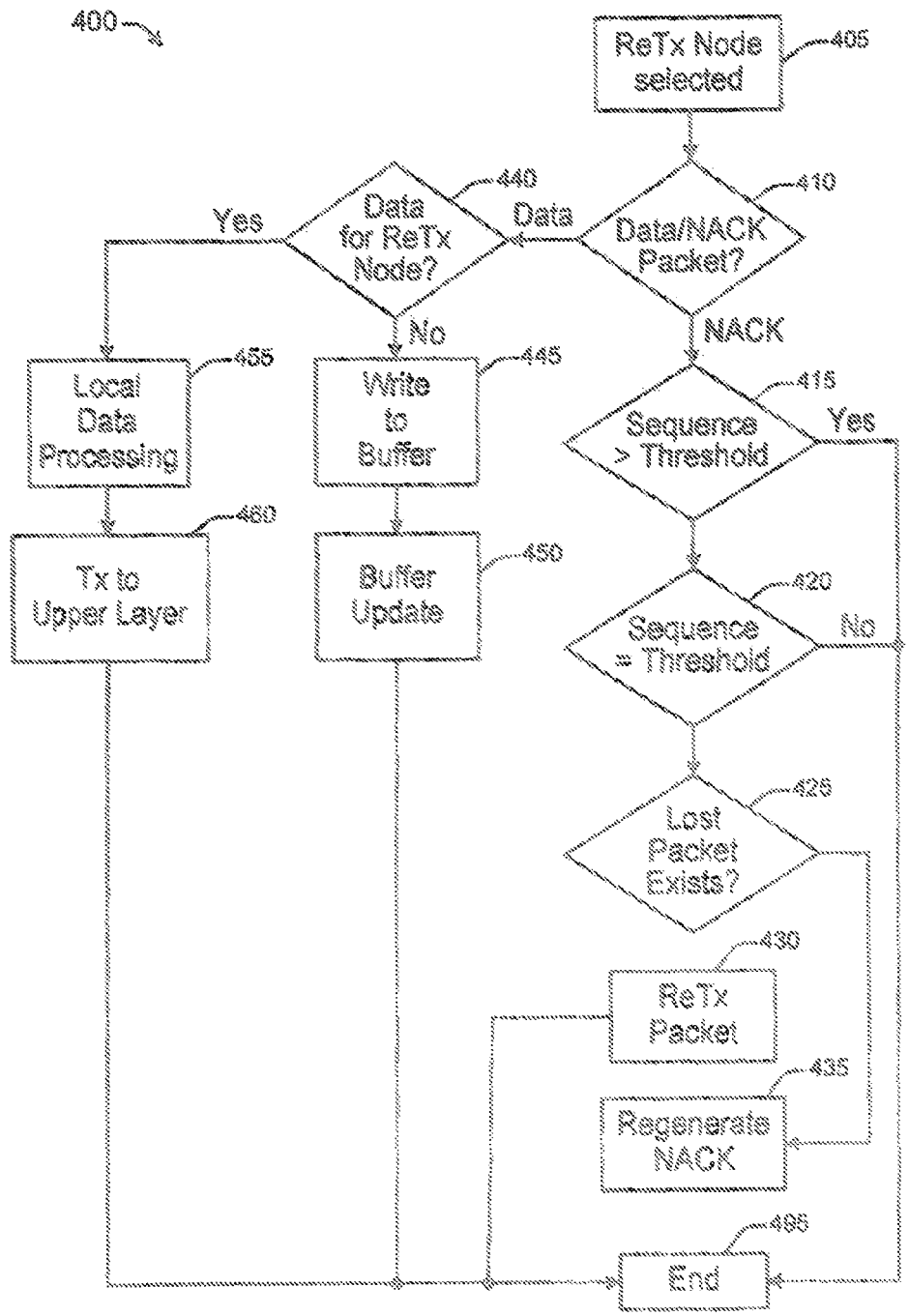
FIG. 4 illustrates and exemplary embodiment of a retransmission process according to the present invention.

Turning now to FIG. 4, The flow chart of the retransmission algorithm for an internal node is shown (400). In this exemplary embodiment, a unicast service is used and the first node is selected as the internal node. For multicast service, the similar processing will be done in each branch. The initial process will determine the role of retransmission node, for example, as the first or second node (405) with index in the transmission path. The service session information will be broadcasted through the path to identify and inform each selected node know of its session assignment. The active nodes should scan channel and capture passed packets and determine whether each packet is a data or NACK packet (410). For data packets, the node then determines whether the packet is addressed to itself, or another node. (440). If the packet is addressed to the node itself, destination address will be checked and the normal packets processing such as integrity checking, refragmentation, payload filtering will be fulfilled (455). The packets will then be transmitted to the upper layer (460). If the data packet is not addressed to the node it will be stored in the local buffer for the reservation in the queue according to its destination (445). The buffer depth can be set dynamically based on the type of service (450). If the packet is determined to be a NACK signal packet from the destination node (410), the sequence number is parsed to determine which time request it is. If the sequence number is larger than the threshold (415), meaning this packet has already been re-requested many times, the node would not respond to the NACK and source node would do the retransmission. If the sequence number is less than or equal to the threshold assigned to the internal node (420) the internal node will compare the sequence number to its assigned threshold number of determine whether or not to give response. The following steps include searching in the buffer to check whether the data block indicated in the NACK is existed (425). If so, the internal node will send out this block in the next retransmission time slot (430). If there is no such data block is found, a new NACK message will be generated with sequence number plus one (435).

The invention claimed is:

1. A method of communicating a packet comprising the steps of:
   receiving the packet from a source;
   receiving a retransmission request for the packet from a first node;
   incrementing a counter indicating the number of times the retransmission request has been received from the first node;
   transmitting the packet to said first node in response to said retransmission request;
   receiving a second retransmission request for the packet from the first node;

receiving the packet from a second node;
receiving a third retransmission request for the packet from the first node; and
receiving the packet from the source.

2. The method of claim 1 further comprising the steps of:
receiving a second retransmission request for the packet from the first node; and
receiving the packet from the source.

3. The method of claim 1 wherein the step of transmitting the packet is initiated in response to the counter indicated a predetermined value.

4. The method of claim 3 wherein the predetermined value is received from the source.

5. The method of claim 1 wherein the packet is transmitted over a power line communication network.

6. The method of claim 5 wherein the power line communication network utilizes time division multiple access.

7. A method of communicating a data packet via a network comprising the steps of:
transmitting a data packet;
receiving a retransmission request for said data packet from a first node;
incrementing a sequence number in response to receiving said retransmission request;
retransmitting said data packet in response to said sequence number reaching a first predetermined value;
receiving a second retransmission request for the data packet from the first node;
receiving the packet from a second node;
retransmitting said data packet in response to receiving said data packet from said second node and in response to said second retransmission request;
receiving a third retransmission request for the data packet from the first node; and
receiving the packet from the source.

8. A method of communication a data packet according to claim 7, further comprising the step of:
enabling a first network node to retransmit said data packet in response to the sequence number reaching a second predetermined value, said second predetermined value being greater than said first predetermined value.

9. A method of communication a data packet according to claim 8, further comprising the step of:
enabling a second network node to retransmit said data packet in response to the sequence number reaching a third predetermined value, said third predetermined value being greater than said second predetermined value.

\* \* \* \* \*